United States Patent

[11] 3,621,268

[72] Inventors Kurt Friedrich
Neckarhausen;
Georg Straimer, Bad Godesberg, both of Germany

[21] Appl. No. 782,547
[22] Filed Dec. 10, 1968
[45] Patented Nov. 16, 1971
[73] Assignee International Standard Electric Corporation
New York, N.Y.
[32] Priority Dec. 19, 1967
[33] Germany
[31] P 15 66 695.2

[54] REFLECTION TYPE CONTACTLESS TOUCH SWITCH HAVING HOUSING WITH LIGHT ENTRANCE AND EXIT APERTURES OPPOSITE AND FACING
15 Claims, 7 Drawing Figs.

[52] U.S. Cl. 250/221,
250/222, 250/226, 250/237, 250/239, 356/210
[51] Int. Cl. G01j 3/34,
G01j 3/50, G06m 7/00
[50] Field of Search 250/221,
237, 239, 222, 226; 315/362; 356/210

[56] References Cited

UNITED STATES PATENTS

| | | | |
|---|---|---|---|
| 1,950,975 | 3/1934 | Davis | 356/210 |
| 2,046,714 | 7/1936 | Wilson et al. | 250/222 X |
| 2,060,957 | 11/1936 | Tarvin et al. | 250/222 X |
| 3,512,003 | 5/1970 | Berry et al. | 250/222 |
| 2,078,800 | 4/1937 | Juchter | 250/239 UX |
| 2,226,677 | 12/1940 | Vikhman | 250/239 UX |
| 2,631,243 | 5/1953 | Weber et al. | 250/239 UX |
| 3,161,777 | 12/1964 | Farmer | 250/239 |
| 3,335,282 | 8/1967 | Masson | 250/237 X |
| 3,340,401 | 9/1967 | Young | 250/221 |
| 3,480,787 | 11/1969 | Johansen | 250/221 |
| 3,483,385 | 12/1969 | Heaslip et al. | 250/239 X |

FOREIGN PATENTS

| | | | |
|---|---|---|---|
| 459,278 | 1/1937 | Great Britain | 356/210 |

*Primary Examiner*—James W. Lawrence
*Assistant Examiner*—T. N. Grigsby
*Attorneys*—C. Cornell Remsen, Jr., Walter J. Baum, Percy P. Lantzy, Philip M. Bolton, Isidore Togut and Charles L. Johnson, Jr.

ABSTRACT: Contactless touch switch in which an electric pulse is produced by light impinging on a photosensitive cell due to reflection of a beam of light. According to the invention the touch switch is constructed in such a manner that the beam of light normally emerges through an aperture in the touch switch housing, which is closed on all sides, and that the photosensitive cell, which is protected by screening, can receive substantially only those rays which are produced by reflection of the beam of light at an object, preferably a finger covering said aperture.

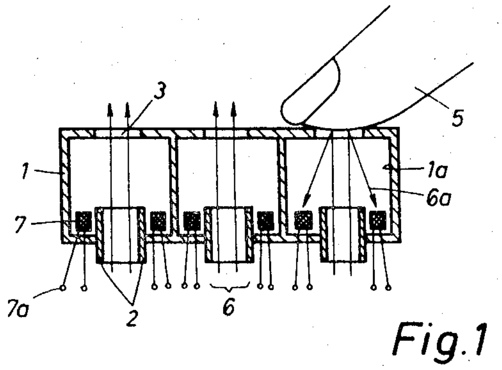
Fig.1
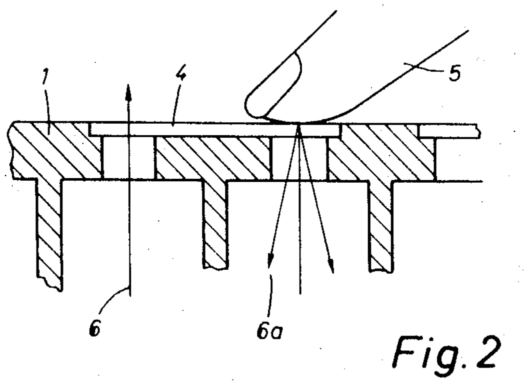
Fig.2
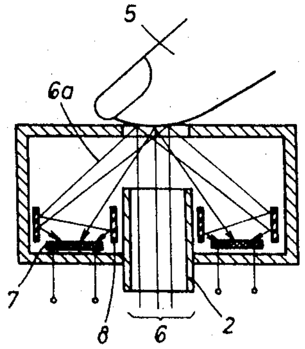
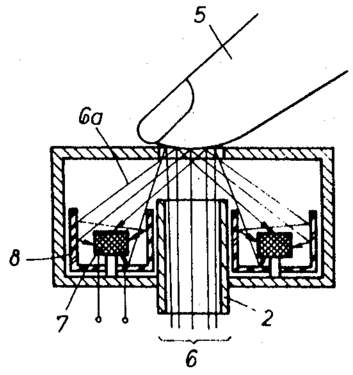
Fig.3 Fig.4
INVENTORS
KURT FRIEDRICH
GEORG STRAIMER
BY [signature]
ATTORNEY

INVENTORS
KURT FRIEDRICH
GEORG STRAIMER

BY Menotti J. Lombardi
ATTORNEY

REFLECTION TYPE CONTACTLESS TOUCH SWITCH HAVING HOUSING WITH LIGHT ENTRANCE AND EXIT APERTURES OPPOSITE AND FACING

This invention relates to a contactless touch switch wherein an electric pulse is produced by light impinging on a photosensitive cell due to the reflection of a ray of light.

In modern apparatus techniques there is the tendency to reduce the extent to which mechanical functional groups are used to a minimum by the extensive use of electronics, in order to substantially eliminate the need for servicing and to reduce the weight of the apparatus and lessen the noise it produces.

This trend has already led to proposals to design manual control elements, such as switches, press-button keys and/or complete banks of keys, on a mechanical basis but in the form of contactless touch switches or keys.

The constructions of this kind hitherto revealed operate on a capacity basis, as disclosed by the subject matter of the German Pat. No. 1,010,139 for example, in which a gas-filled cold cathode tube is used and whose ignition voltage is only reached when an earth connection to an auxiliary electrode is established by body contact achieved by touching a key button.

Touch switches based on this principle still call for a relatively large amount of circuit components. In addition, such switches are so bulky that it is not possible, for example, to form multiple key banks with the spacing normally employed in typewriter keyboards. Moreover, the overall height of such switches is too great for their use not to involve difficulties in many cases.

For this reason, there has been proposed in our copending U.S. application Ser. No. 782,656, filed Dec. 10, 1968; U.S. Pat. No. 3,526,775. a contactless touch switch wherein the principle of the light barrier is used such that the ray of light passes through a trough which is constructed in such a manner that the ray may be interrupted by the insertion of the hand or part thereof.

The necessary insertion of for example a finger into the trough of such a construction can, in some cases, be the cause of a certain amount of difficulty of operation.

This drawback is avoided in the touch switch of the present invention, which is characterized in that the ray of light normally emerges through an aperture in the touch switch housing, which is closed on all sides, and the screen-protected photosensitive cell may be affected substantially only by rays caused by reflection of the ray of light by an object covering said aperture.

The invention is described below with reference to embodiments illustrated in the accompanying drawings.

FIG. 1 is a diagrammatic cross-sectional view of a number of touch switches of the invention combined in a single unit;

FIG. 2 is a cross section of the top part of the touch switch housing shown in FIG. 1, showing a translucent covering for the aperture;

FIGS. 3 and 4 are cross sections of embodiments of the touch switch illustrated in FIG. 1, in which mirrors are used to increase the luminous efficiency of the system;

Figure 5:
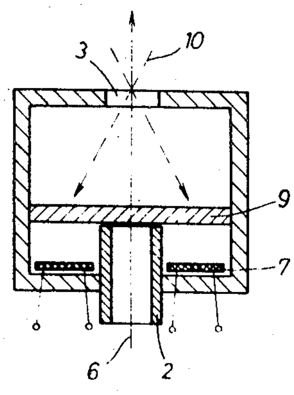
FIGS. 5 and 6 are cross sections of a modification of the touch switch illustrated in FIG. 1, in which a light filter located in the path of radiation greatly suppresses influence by the ambient light.

The diagrammatic representation given in FIG. 1 illustrates the basic principle of the touch switch of the invention. The three touch switches which are combined in a single housing 1 to form a unit are functionally completely separate from each other. The housing 1 which surrounds each touch switch interior on all sides has an aperture in its underside in which a tube-shaped screen 2 is mounted. The oppositely located cover panel of the housing 1 is provided with an aperture 3 corresponding to the diameter of said tube. Beneath the screen 2 there is disposed a light source (not shown) which provides a concentrated parallel beam of light 6, which, in the nonactuated state of the switch, passes unhindered through the housing 1 in the manner shown to emerge therefrom through the aperture 3. The photosensitive cells 7, hereinafter referred to as photoelectric cells, are each disposed in the chamber behind the tube-shaped screen 2. In order to substantially suppress any interference which may arise from external radiation, for example from the ambient light falling through the aperture 3, the inside walls of the housing 1 are provided with a light-absorbent coating 1*a*.

If one of the apertures shown in FIG. 1 is covered for example by laying the hand or a part thereof, such as a finger 5, over the aperture, reflection of the ray of light 6 is caused thereby such that scattered reflected light 6*a* impinges on the photoelectric cells 7, disposed behind the screen 2, from above so as to excite them and thus cause a potential to be produced at the terminals 7*a*, which potential may be recognized, for example, as indicative of actuation of the touch switch by a series-connected evaluating electronic system (not shown).

In order to prevent dirt and dust from reaching the interior of the touch switch, it is desirable to provide the apertures 3 with a translucent covering 4, as shown in FIG. 2, where it will be seen that the said covering is fitted in the cover panel of the touch switch housing 1.

In order to increase the efficiency of the reflected radiation 6*a*, mirrors 8 are placed around the photoelectric cells 7 in the embodiments shown in FIGS. 3 and 4 with the cells 7 again being screened by the screen 2. In this way the scattered reflected radiation 6*a* is concentrated on to the respective photoelectric cell 7.

The embodiments described above are based on the assumption that the ambient light passing through the aperture 3 and impinging on the cells in the nonactuated state of the touch switch is so slight compared with the effective useful radiation that no unintentional actuation may be expected as a result of external radiation when the photoelectric cells 7 are of suitable response sensitivity.

Figure 6:
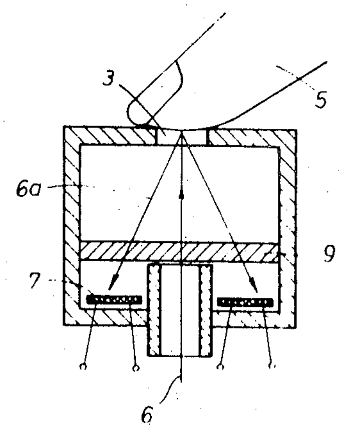
Figure 7:
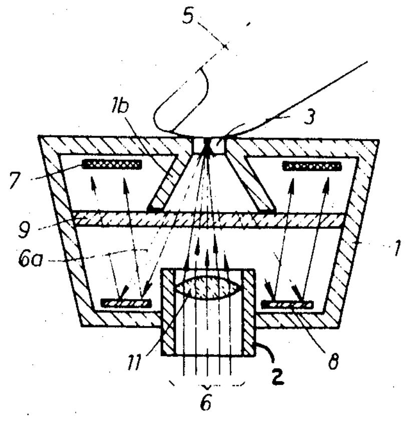
FIG. 7 shows a touch switch based on the principle of that shown on FIG. 5 or FIG. 6.

As an extra safeguard, there are provided, in the embodiments shown in FIGS. 5 to 7; light filters 9 which allow the passage of radiation of certain wavelengths only, in known manner. In such cases the source generating the useful radiation 1 must be such that the major portion of its radiation energy lies in that part of the spectrum for which the light filter 9 is permeable.

FIGS. 5 and 6 show such a touch switch in cross section, a light filter 9 being provided above the photoelectric cells 7 and the screen 2, unlike the embodiment shown in FIG. 1. In accordance with the above, this filter is no obstacle to the main part of the radiation 6 so that the latter can pass through at approximately full strength, whereas the ambient light 10 penetrating from above through the aperture 3 and mostly of other wavelengths is so strongly absorbed or reflected that the portion thereof reaching the photoelectric cells 7 no longer has any effective influence. If, however, the aperture 3 is covered, for example by laying a finger 5 across it, the radiation 6 is reflected in the manner described above and the scattered reflected light 6*a* can pass through the filter 9 unhindered to excite the photocells 7, which give indication of the actuated condition in a form which can be evaluated by the electronic system used.

FIG. 7 is a structural modification of the previous embodiment, also shown in cross section. In this case the photoelectric cells 7 are located laterally of the aperture 3 in the touch switch housing 1 and are screened from external light by a funnel-shaped screen 1*b* extending inwardly from the aperture 3. Beneath this screen there is disposed a light filter 9, and mirrors 8 are provided in the space adjacent the screen 2. In this case the screen 2 also serves as a mount for a concentrating lens 11 which focuses the radiation 6 on to the center-point of the aperture 3. Again, the major portion of the radiation 6 is of a wavelength which can pass through the filter 9.

When the aperture 3 is covered for example by a finger 5, the said reflection takes place. The scattered reflected radiation 6a which is restricted to a predetermined angle by the funnel-shaped screen 1b, repasses the filter 9 in the reverse direction and impinges on the mirrors 8, by which it is reflected upwardly towards the photoelectric cells 7 and again passes through the filter 9. The source providing the radiation 6 must be relatively intense, since the multiple penetration of the filter 9 involves a certain loss of efficiency. On the other hand, this arrangement has the advantage that, with a suitably chosen filter, accidental actuation of the touch switch by strong incident light derived from the surroundings is avoided with certainty.

We claim:

1. An improved radiation-responsive contactless touch switch of the type in which an electric pulse is produced whenever reflected radiation from a source impinges on a radiation detector, wherein the improvement comprises:

a. a housing having a chamber which is accessible via a pair of apertures, the one aperture having a guide screen arranged therein which extends into said chamber and the other aperture being positioned opposite and facing said one aperture to provide in the quiescent mode of operation an egress for radiation entering said chamber via said one aperture;

b. a radiation source positioned to emit radiation through said guide screen; and c. a radiation detector positioned within said chamber and behind the extended portion of said guide screen, said detector being sensitive and accessible to diffused radiation from said source which is reflected back from said other aperture while being inaccessible to direct radiation from said source.

2. The contactless touch switch according to claim 1 wherein the extended portion of said guide screen is tube-shaped.

3. The contactless touch switch according to claim 2 wherein a plurality of radiation detectors are arranged within said chamber around said tube-shaped screen so as to be accessible only to diffused reflected radiation from said source.

4. The contactless touch switch according to claim 1 wherein at least one mirror is positioned within said chamber in close proximity to said detector, said mirror being arranged to direct additional diffused radiation from said source onto said detector.

5. The contactless touch switch according to claim 4 wherein a plurality of radiation detectors are arranged within said chamber around said tube-shaped screen so as to be accessible only to diffused reflected radiation from said source, each of said plurality having a mirror positioned in close proximity thereto to direct additional diffused radiation from said source onto said detector.

6. The contactless touch switch according to claim 5 wherein a pair of mirrors are arranged on opposite sides of a corresponding one of each of said plurality of radiation detectors and in close proximity thereto.

7. The contactless touch switch according to claim 4 wherein the radiation-sensitive surface of said detector is substantially perpendicular to the direction of the direct radiation from said source entering said chamber and wherein said mirror is arranged substantially perpendicular to said radiation-sensitive surface.

8. In contactless touch switch according to claim 4 wherein said radiation detector has at least two radiation-sensitive surfaces and wherein said mirror is L-shaped and is positioned in close proximity to said detector to direct the diffused radiation from said source to said at least two surfaces of said detector.

9. The contactless touch switch according to claim 1 wherein radiation filter means are positioned in said chamber to prevent all but a predetermined frequency band of said radiation emitting from said source to be directed to said other aperture.

10. The contactless touch switch according to claim 9 wherein said filter means are arranged within said chamber to permit only diffused radiation from said source within said predetermined band to reach said detector.

11. The contactless touch switch according to claim 10 wherein mirror means are positioned within said chamber to direct additional diffused radiation of said predetermined band from said source onto said detector.

12. The contactless touch switch according to claim 11 wherein said mirror means are positioned adjacent to said guide screen and wherein said detector is positioned adjacent to said other aperture such that the only radiation reaching said detector is of said predetermined band which, in dependence on said mirror means, has passed through said filter means twice as diffused radiation.

13. The contactless touch switch according to claim 12 wherein said other aperture is provided with a conical-shaped screen which opens into said chamber so as to receive the direct radiation from said source, said conical-screen being arranged to aid the diffused radiation from said source to be directed through said filter means to said detector via said mirror means.

14. The contactless touch switch according to claim 13 wherein a lens arrangement is provided in said guide screen to focus the direct radiation from said source toward said conical screen.

15. An improved radiation-responsive contactless touch switch of the type in which an electric pulse is produced whenever reflected radiation from a source impinges on a radiation detector, wherein the improvement comprises:

a. a housing having a chamber which is accessible via a pair of apertures, the one aperture having a guide screen arranged therein which extends into said chamber and the other aperture being positioned opposite end facing said one aperture to provide in the quiescent mode of operation an egress for radiation entering said chamber via said one aperture;

b. a radiation source positioned to emit radiation through said guide screen;

c. a radiation detector positioned within said chamber and behind the extended portion of said guide screen, said detector being sensitive and accessible to diffused radiation from said source which is reflected back from said other aperture while being inaccessible to direct radiation from said source; and d. radiation filter means positioned in said chamber to prevent all but a predetermined frequency band of said radiation emitting from said source to be directed to said other aperture, said filter means being arranged to permit only diffused radiation from said source within said predetermined band to reach said detector.

* * * * *